United States Patent [19]
Khederzadeh et al.

[11] Patent Number: 5,926,166
[45] Date of Patent: *Jul. 20, 1999

[54] COMPUTER VIDEO DISPLAY SWITCHING SYSTEM

[75] Inventors: Massoud Khederzadeh, Houston; Jiming Sun, Spring; Jon G. Lloyd, Stafford, all of Tex.

[73] Assignee: Compaq Computer Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/517,145

[22] Filed: Aug. 21, 1995

[51] Int. Cl.$^6$ ........................................................ G09G 5/00
[52] U.S. Cl. ................................................ 345/132; 345/3
[58] Field of Search ................................ 345/132, 3, 112, 345/127, 153, 156, 118, 119, 1, 100; 395/128, 102, 139

[56] References Cited

U.S. PATENT DOCUMENTS

| | | | |
|---|---|---|---|
| 4,855,728 | 8/1989 | Mano et al. | 345/3 |
| 5,065,346 | 11/1991 | Kawai et al. | |
| 5,150,109 | 9/1992 | Berry | 345/3 |
| 5,351,064 | 9/1994 | Zenda | 345/132 |
| 5,420,605 | 5/1995 | Vouri et al. | 345/132 |
| 5,448,260 | 9/1995 | Zendu et al. | 345/132 |
| 5,475,808 | 12/1995 | Kobayashi | 345/132 |
| 5,477,241 | 12/1995 | Higgins et al. | 345/132 |
| 5,488,385 | 1/1996 | Singhal et al. | 345/3 |
| 5,694,141 | 12/1997 | Chee | 345/3 |

FOREIGN PATENT DOCUMENTS

| | | | |
|---|---|---|---|
| 277085 | 3/1990 | Japan | 345/3 |
| 5173524 | 7/1993 | Japan | 345/3 |
| 2214766 | 6/1989 | United Kingdom | 345/3 |

OTHER PUBLICATIONS

Intel Corporation, *Pentium™ Processor User's Manual, Vol. 3: Architecture and Programming Manual,* © Intel Corporation 1994, Chapter 20 System Management Mode, pp. 20–1 through 20–9.

Intel Corporation, *Intel486™ SL Microprocessor SuperSet Programmer's Reference Manual, System and Power Management,* Nov. 1992, pp. 6–28 through 6–53.

*Primary Examiner*—Regina Liang
*Attorney, Agent, or Firm*—Akin, Gump, Staruss, Hauer & Feld, L.L.P.

[57] ABSTRACT

A system and method for enabling a computer user to switch between a higher resolution display and a lower resolution display, or to display simultaneously with both displays, while the operating system is active, the higher resolution display displaying with a higher resolution than the lower resolution display. More particularly, video device drivers are provided with the resolution characteristics of the two displays. The system management BIOS generates an event in response to a user pressing a predetermined keyboard "hot key". The operating system detects the event and broadcasts the event to video device drivers. The video device drivers then adjust the resolution, resize and move an application or applications under execution to properly fit on the display.

15 Claims, 2 Drawing Sheets

5,926,166

COMPUTER VIDEO DISPLAY SWITCHING SYSTEM

BACKGROUND OF THE INVENTION

This invention relates generally to computer video display switching systems and more particularly to systems for enabling a user to switch between a pair of video displays.

Notebook, or other portable computers generally include an internal video display. The internal display is relatively small. Therefore, while the portable computer user is provided with a relatively small computer for use on trips away from the office, the user may want the capability of a larger external video display at the office. Further, the user, when working on the computer at the office, may wish to switch between the resolution of the external display and the resolution of the internal display, or may wish to use both displays simultaneously. Further, the user may wish to perform such video display switching without leaving the application currently in use. That is, the user may wish to perform the video display switching without having to reboot the computer or without having to exit and then re-enter a graphic type operating system (OS), such as Windows or OS/2 operating systems.

SUMMARY OF THE INVENTION

The present invention provides control of two video displays from a computer while an operating system and one of the displays are active. Information is displayed at one resolution on one of the displays and, while the operating system and one of the displays are active, information is displayed at a different resolution on the other one of the displays.

More particularly, a system and method are provided for enabling a computer user to switch between a higher resolution display and a lower resolution display, or to display simultaneously with both displays, while the operating system and one of the displays are active and with the higher resolution display displaying with a higher resolution than the lower resolution display. In a preferred embodiment, video device drivers are provided with the resolution characteristics of the two displays. The system management BIOS generates an event in response to a command. In a preferred embodiment the command is the user pressing a predetermined computer mounted tactile button, such as a keyboard "hot key". The operating system detects the event and broadcasts the event to the video device drivers. The video device drivers then adjust the resolution, and resize and move any active application, or applications, to properly fit on the display.

BRIEF DESCRIPTION OF THE DRAWINGS

For a more complete understanding of the concepts of the invention reference is now made to the following drawings, in which.

DESCRIPTION OF THE PREFERRED EMBODIMENTS

Figure 1:
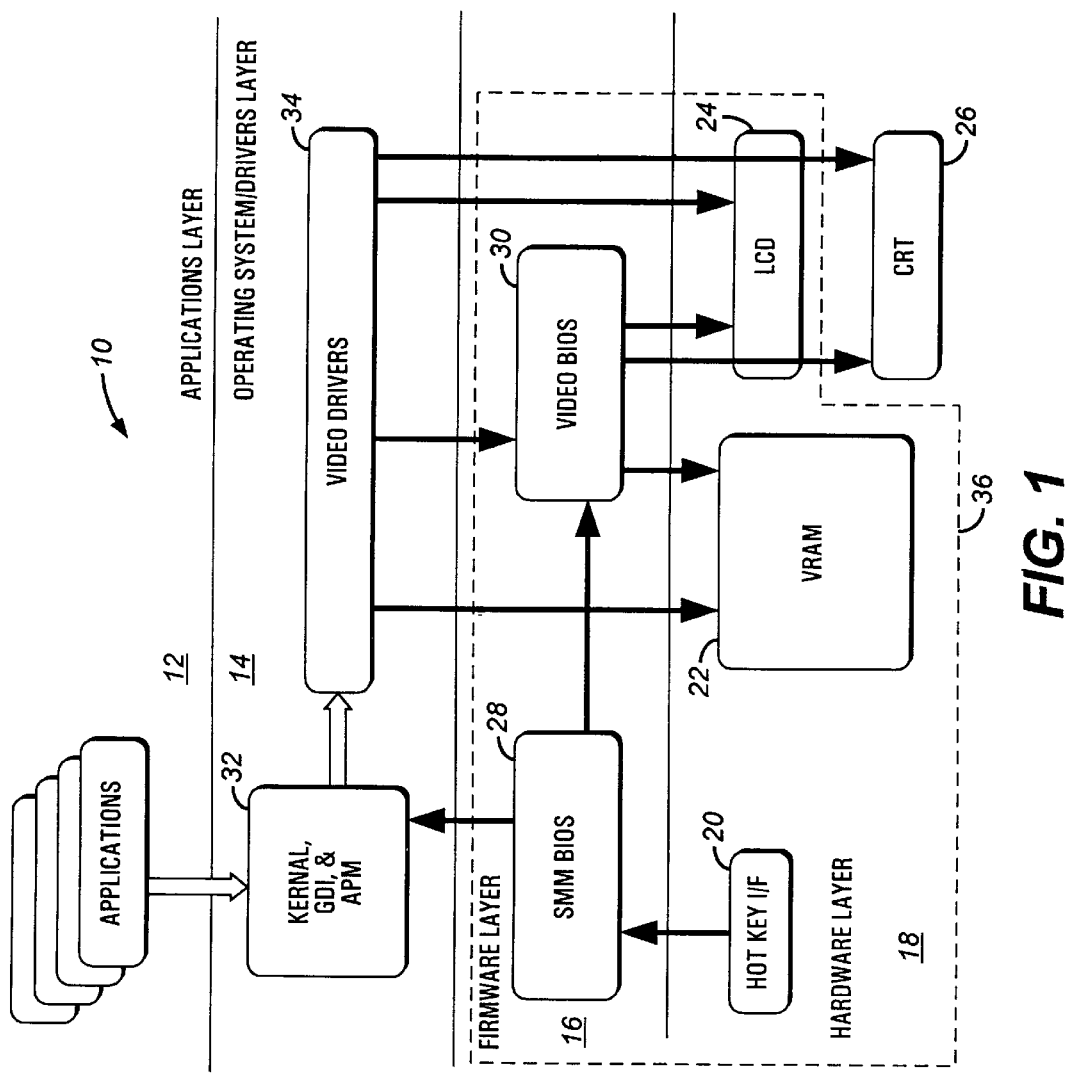
FIG. 1 is a block diagram of a portable computer having an internal video display with a relatively low resolution and connected to an external video display having a relatively high resolution, such block diagram showing the video system architecture of the computer; and, FIG. 2 is a flow diagram of the method used by the computer of FIG. 1 in switching between the internal video display and the external video display, or to display simultaneously with both displays.

Referring to FIG. 1, a video system architecture 10 includes an applications layer 12, an operating system/ drivers layer 14, a firmware layer 16, and a hardware layer 18, arranged in a conventional manner. The hardware layer 18 includes a keyboard 20, here a conventional keyboard having, inter alia, alphanumeric keys and conventional function keys, $F_1$–$F_{12}$, not shown. The hardware layer 18 also includes a conventional video random access memory (VRAM) 22 and a pair of video displays 24, 26. Here, video display 24 is a conventional liquid crystal display (LCD) panel having a rectangular array of LCD's arranged in rows and columns, here an array of at least 640 rows of pixels and 480 columns of pixels, or higher. Video display 26 is here a CRT display having a higher resolution than that of the LCD video display 24. Here, for example, video display 26 may be a VGA (640 by 480) or SVGA display having an 800 by 600 pixel resolution, or higher.

The firmware layer 16 includes a conventional System Management Mode Basic Input/Output System (SMM BIOS) 28 and video BIOS 30. The System Management Mode has the highest priority over other interrupts in the system and is transparent to the operating system.

The operating system/driver layer 14 includes any conventional operating system, here, for example a Windows or OS/2 operating system. The operating system/driver layer 14 includes a Kernel, graphic display interface (GDI) and Advanced Power Management (APM) module 32 and video drivers 34. The APM is the interface which the operating system uses to send and receive power management events, information, and commands to and from the SMM BIOS 28.

The application layer 12 includes application programs which may run on the operating system. With a Windows operating system, the application programs may appear as icons or may appear in "windows".

Here, the keyboard 20, VRAM 22, the internal LCD panel 24 of hardware layer 18 and the firmware layer 16 are included in a notebook or portable computer 36. The higher resolution CRT display 26 is an external display which is adapted to be plugged in to an external port of the portable computer 36, in a conventional manner. For example, the external CRT display 26 may be connected to a docking station adapted to receive the portable computer 36. The operating system/driver layer 14 is software stored in the memory, not shown, of the portable computer 36.

The portable computer 36 is adapted to enable a user to switch between the higher resolution display 26 and the lower resolution display 24, or to display simultaneously with both displays 24, 26, while the operating system/driver layer 14 is active and with the higher resolution display 26 displaying with a higher resolution than the lower resolution display 24. Video device drivers 34 are provided with the resolution characteristics of the two displays 24, 26. The SMM BIOS 28 generates an event in response to a command, such as the user pressing a predetermined computer 36 mounted tactile button, here a keyboard "hot key", such as the simultaneous pressing of the Alt key and one of the function keys. The APM drivers of Kernel, GDI and APM module 32 detect the event and broadcast the event to video device drivers 34. The video device drivers 34 then adjust the resolutions, and resize and move an application or applications 12 under execution to properly fit on the selected one or ones of the displays 24, 26.

Figure 2:
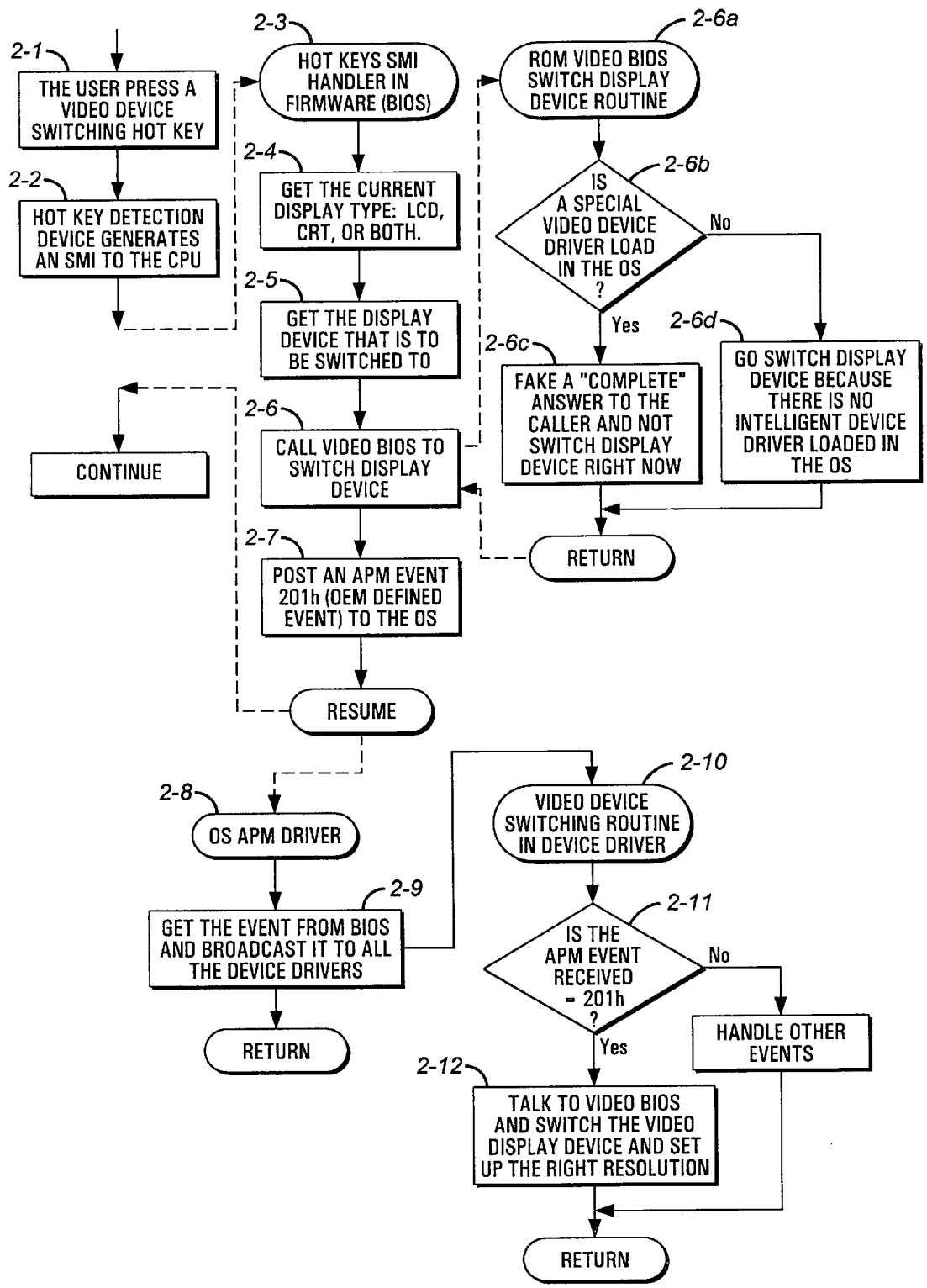

The process summarized above is shown in more detail in FIG. 2. Referring to step 2-1 of FIG. 2 while the computer operating system is active (i.e., running), an interrupt is generated in response to a user pressing the predetermined keyboard "hot key". In response to each depression of the "hot key", video display selection sequences, or toggles, through the following: display on LCD panel 24; display on CRT display 26; and simultaneous display on both the LCD panel 24 and CRT display 26. Thus, for example, if initially LCD panel 24 is active (i.e., selected), pressing of the "hot key" will result in CRT display 26 being selected; a subsequent pressing of the "hot key" will result in simultaneous display; and, a subsequent pressing of the "hot key" will result in a return to the selection of the LCD panel 24.

In response to the user pressing the "hot key", a System Management Interrupt (SMI) is generated to the central processing unit (CPU) and a hot key SMI handler in the SMM BIOS 28 of firmware layer 16 is called to handle the interrupt (Steps 2-2 and 2-3). A determination is made by the video BIOS 30 of the one or ones of the displays currently active (Step 2-4). That is, a determination is made as to whether the LCD panel 24 is active, whether the CRT display 26 is active, or whether both displays 24, 26 are simultaneously active (Step 2-4). Next, a determination is made of the desired display or displays to be selected or made active. (Step 2-5) The "hot key" interrupt handler in the SMM BIOS 28 keeps track of the above described toggling.

Next, a call is made to the video BIOS 30 to select, or make active, the desired display, or displays (Step 2-6). When the operating system was booted up, the video drivers 34 indicated to the video BIOS 30 their availability. Now, the video BIOS 30 checks internally the availability of the video drivers 34 (Step 2-6a). A determination is made as to whether a video display driver is loaded into the operating system/video driver layer 14 that can provide the resolution required in response to an APM event (Step 2-6b) and communicate with the video BIOS 30 to determine the one or ones of the displays to make active (i.e., if the video driver is "special"). If such a video driver is "special" (i.e., the video driver installed can provide the desired resolution), a "fake complete answer" is provided to the caller (i.e., the SMI) to tell it that the switch is complete and the display is not switched at this time (Step 2-c). If a special video driver is not present (i.e., available), the video BIOS 30 tries to switch to the determined, next one or ones of the displays 24, 26 to be switched to during the next cycle (Step 2-6d).

Next, an OEM APM event is posted in the operating system/video driver layer 14 in response to an indication that the video BIOS 34 has executed the video switch call. Here, for example the APM event is a (201 hex) APM event (Step 2-7). Next, the OEM APM event is broadcast to all the video device drivers 34 (Steps 2-8, 2-9 and 2-10). Next, a video device switching routine is executed by the video device drivers 34 (Step 2-11). A determination is made of whether a 201 hex APM event is received (step 2-12). If the (201 hex) APM event has been received by the video drivers 34, the video BIOS 30 is told to switch to the selected one, or ones, of the video display 24, 26 and set the resolution of selected display, or displays, to the resolution desired.

Other embodiments are within the spirit and scope of the following claims.

What is claimed is:

1. A method for enabling a computer to switch while running under a system management mode BIOS between a higher resolution display and a lower resolution display without exiting an operation system, the method comprising the steps of:

providing video device drivers with the resolution characteristics of the two displays;

generating in the system management mode BIOS, an event in response to a command to select one of the two displays;

detecting, in the operating system, the event and broadcasting the event to the video device drivers;

activating the selected display from an inactive state; and adjusting the video device drivers to provide the resolution for the selected display.

2. The method recited in claim 1 wherein the event is an Advanced Power Management event.

3. The method recited in claim 2 wherein the command is produced in response to a user initiated command.

4. The method recited in claim 3 wherein the command is produced in response to a user pressing a predetermined keyboard "hot key".

5. The method recited in claim 1, further comprising:

maintaining both the higher resolution and lower resolution displays active simultaneously.

6. A method for enabling a computer to switch while active under an operating system between video displays adapted to operate with video drivers having different display resolution characteristics, the resolution characteristics of the display being stored by the computer, the method comprising the steps of:

generating an interrupt in response to a command while the computer operating system is active;

determining the one, or ones, of the displays currently active;

determining, in response to the generated interrupt, the desired display, or displays, to be activated;

calling a video BIOS in the computer to switch to the desired display, or displays, posting an OEM defined Advanced Power Management event to the operating system in response to an indication that the video BIOS has executed the video switch call;

broadcasting the posted event to the video device drivers;

retrieving from the video BIOS the one, or ones of the displays selected to be activated;

obtaining the resolution of the selected display, or displays;

executing the obtained resolution; and indicating the video BIOS that the switch has been executed.

7. The method recited in claim 6 wherein the calling is performed by a System Management Interrupt (SMI) of the operating system and including the steps of determining the video device driver loaded in the operating system and telling the caller that a video switch is complete.

8. The method recited in claim 6 wherein the command produced in response to a user pressing a keyboard "hot key".

9. A system for enabling a computer to switch between a higher resolution display and a lower resolution display, one of which is inactive, while the computer is operating in a system management mode BIOS, without exiting an operating system such system comprising:

a predetermined actuatable device on the computer for generating an interrupt when a display is to be switched; and a controller for switching, in response to the predetermined actuatable device, to the display previously inactive while the operating system is active, wherein the controller is configurable to switch to both displays simultaneously.

10. The system recited in claim 9 wherein the actuatable device is a "hot key" on a keyboard of the computer.

11. A system for enabling a computer user to switch between a higher resolution display and a lower resolution display for the computer while operating a system management mode BIOS without exiting an operating system, such system comprising:
   video device drivers adapted for providing the resolution characteristics of the two displays;
   a system management BIOS adapted to generate an event in response to a user pressing a predetermined key on a keyboard; and
   a controller responsive to the event to determine which of the displays to select,
   wherein the video device drivers then adjust the resolution for the selected one of the displays.

12. The system of claim 11, wherein the controller includes a video BIOS.

13. The system of claim 11, wherein the controller can select both displays to be active simultaneously.

14. A system for enabling a computer user to switch between a higher resolution display and a lower resolution display, such system comprising:
   a predetermined key on a keyboard of the computer for generating an interrupt in response to a user engaging such predetermined keyboard key;
   firmware, in the computer, responsive to the pressing of the key, for posting a system management interrupt;
   an operating system and video driver section in the computer, for switching, in response to the system management interrupt, to the selected one of the displays while the operating system is active, the video driver section having the resolution characteristics of the displays, wherein the video driver section adjusts the resolution of the selected display.

15. The system of claim 14, wherein the operating system and video driver section can select both displays to be active simultaneously.

* * * * *